(12) United States Patent
Fluckiger

(10) Patent No.: US 6,643,000 B2
(45) Date of Patent: Nov. 4, 2003

(54) EFFICIENT SYSTEM AND METHOD FOR MEASURING TARGET CHARACTERISTICS VIA A BEAM OF ELECTROMAGNETIC ENERGY

(75) Inventor: David U. Fluckiger, Allen, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/053,437

(22) Filed: Jan. 17, 2002

(65) Prior Publication Data

US 2003/0137645 A1 Jul. 24, 2003

(51) Int. Cl.[7] .............................. G01P 3/36; G01C 3/08
(52) U.S. Cl. ......................................... 356/28; 356/4.01
(58) Field of Search .......................... 356/4.01, 28, 364, 356/491

(56) References Cited

U.S. PATENT DOCUMENTS 5,798,833 A * 8/1998 Onuki et al. ................ 356/256

OTHER PUBLICATIONS

M. Mansuripur and E.M. Wright, "Linear Optical Vortices," Optics & Photonics News, 40–43 (1999).
M. Mansuripur et al., "Geometric–optical Rays, Poynting's Vector, and Field Momenta," Optics & Photonics News, 53–56 (1999).
R. M. Kiehn, "Optical Vortices, Faraday Rotation, Optical Activity," Emeritus, Phys Dept., Univ. Houston, 1–7, http://www.cartan.pair.com (Apr. 17, 2000 Updated Aug. 25, 2001).

(List continued on next page.)

Primary Examiner—Thomas H. Tarcza
Assistant Examiner—Brian K Andrea
(74) Attorney, Agent, or Firm—Colin M. Raufer; Leonard A. Alkov; Glenn H. Lenzen, Jr.

(57) ABSTRACT

An efficient system (10) for measuring target characteristics via a torsion mode beam of electromagnetic energy. The system (10) includes a first mechanism (34, 38, 40, 42, 16) for transmitting the torsion mode beam toward a target (12). A second mechanism (16, 18, 20) receives the resulting target return beam and provides a first signal in response thereto. A third mechanism (26, 28) employs the first signal to determine rotational characteristics of the target (12). In a specific embodiment, the system (10) further includes a fourth mechanism (20, 26) that reduces or eliminates noise in the return beam based on common mode noise rejection. A fifth mechanism (32) identifies the type of the target based on the target rotational characteristics via comparison to predetermined target rotational signatures (36). An additional mechanism (24, 40, 42) selectively switches the mode of the beam between a first mode and a second mode. The first mechanism (34, 38, 40, 42, 16) and second mechanisms (16, 18, 20) employ a laser transceiver (16) having a transmit chain (34, 38, 40, 42, 16) and a receive chain (16, 18, 20). The transmit chain includes a time-division multiplexer (34) or a spatial multiplexer (34, 62) for selectively transmitting the beam of electromagnetic energy or for selectively transmitting first and second spatially separated beams characterized by the first and second modes, respectively. The receive chain (16, 18, 20) includes a corresponding time-division demultiplexer (20, 26) or spatial demultiplexer (16, 64, 66, 26), respectively, for providing the first signal. In a more specific embodiment, the first mode is a left-handed Laguerre-Gaussian torsion mode, and the second mode is a right-handed Laguerre-Gaussian torsion mode. The third mechanism (26, 28) determines rotational Doppler due to reflection of the beam of electromagnetic energy from the target.

35 Claims, 4 Drawing Sheets

OTHER PUBLICATIONS

R. M. Kiehn, "Electromagnetic Waves in the Vacuum with Torsion and Spin," Phys Dept., Univ. Houston, 1–4, http://www.cartan.pair.com, (Mar. 7, 1998).

R. M. Kiehn, "The Photon Spin and other Topological Features of Classical Electromagnetism," 1–17, http://www.cartan.pair.com, (Jun. 8, 2002).

R. M. Kiehn, "Torsion and Spin as Topological Coherent stuctures in Plasmas," Emeritus, Phys Dept. Univ. Houston, 1–44, http://www.cartan.pair.com, (Mar. 13, 2000).

A. A. Ishanya, G. Machavariani, N. Davidson, E. Hasman and A. A. Friesom, "Optical Wave Fronts: Efficient Mode Conversion of Laser Beams," Optics and Photonics News, 43, Dec. 2002.

M. Padgett, J. Arit, and N. Simpson, L. Allen, "An experiment to observe the intensity and phase structure of Laguerre–Gaussian laser modes," Am. J. Phys. 64 (1), 77–82, (Jan. 1996).

M. Loktev et al., "Singular beam synthesis by means of one–dimensional phase elements," Proceedings of SPIE, "International Conference on Singular Optics," vol. 3487, 123, (1997).

V.P. Aksenov et al., "Vizualization of the Phase Singularities in Wavefront Sensors," Proceedings of SPIE, "International Conference on Singular Optics," vol. 3487, 117, (1997).

A. N. Alexseyev et al., "Generation of optical vortices in magnetic holograms grating and in astigmatic lenses convertor," Proceedings of SPIE,"International Conference on Singular Optics," vol. 3487, 101–107 (1997).

I. V. Basistiy et al., Experimental observation of rotation and diffraction of a "singular" light beam, Proceedings of SPIE, "International Conference on Singular Optics," vol. 3487, 34–38 (1997).

M. V. Vasnetsov et la., "Free–space evolution of monochromatic mixed screw–edge wavefront dislocations," Proceedings of SPIE, "International Conference on Singular Optics," vol. 3487,28(1997).

G. F. Brand, "Phase singularities in beams," Am. J. Phys. 67, (1), 55–60 (Jan. 1999).

W. Beijersbergen, L. Allen, H.E.L.O. van der Veen, and J. P. Woerdman, "Astigmatic laser mode converters and transfer of orbital angular momentum," Opt. Commun. 96, 123–132 (1993).

G. F. Brand, "Millimeter–Wave Beams With Phase Singularities," IEEE Transactions on Microwave Theory and Techniques, vol. 46, No. 7, 948–951, Jul. 1998.

S. Ramee, R. Simon, "Effect of holes and vortices on beam quality," JOSA–A 17, 84–94 (2000).

M.S. Soskin and M.V. Vasnetov, "Singular Optics," in Progress in Optics, E. Wolf, ed. (Elsevier, Amsterdan, 2001), vol. 42, pp. 219–276.

J. F. Nye and M. V. Berry, Proc. R. Soc.London, Ser. A33t, 165–190(1974).

L. Allen, M. W. Bejersbergen, R. J. C. Spreeuw, and J. P. Woerdman, "Orbital angular momentum of light and the transformation of Laguerre–Gaussian laser modes," Phys. Rev.A45, 8185–8189(1992).

V. Yu. Bazhenov, M. S. Soskin, and M. V. Vasnetsov, "Screw dislocations in light wavefronts," J. Mod. Opt. 39, 985–990 (1992).

N. R. Heckenbert, R. McDuff, C. P. Smith, and A. G. White,"Generation of optical phase singularities by computer–generated holograms," Opt. Lett. 17 (3), 221–223 (1992).

L. Allen, M. W. Bejersbergen, R. J. C. Spreeuw, and J. P. Woerdman, "Orbital angular momentum of light and the transformation of Laguerre–Gaussian laser modes," Phys-.Rev.A 45,8185–8189(1992).

V. Yu. Bazhenov, M. S .Soskin, and M. V. Vasnetsov, "Screw dislocations in light wavefronts," J. Mod. Opt. 39, 985–990 (1992).

M.S. Soskin, V. N. Vasnetsov. J. T. Malow, and N. R. Heckenbert, "Topological charge and angular momentum of light beams carrying optical vorticies," Phys. Rev. A 56 4064–4075 (1998).

M. Harris, C. A. Hill and J. M. R. Vaughan, "Optical helices and spiral interference fringes," Opt. Commun. 106, 161–166 (1994).

S. A. Ponomarenko, "A class of partially coherent beams carrying optical vortices," JOSA–A 18, 150–156 (2001).

J. Courtial, K. Dholakia, D. A. Robertson, L Allen, M. J. Padgett, "Measurement of the rotational frequency shirt imparted to a rotating light beam possessing orbital angular momentum," Phys. Rev. Lett. 80 3217–3219 (1998).

L.Allen, M. Babiker, W. L. Power,"Azimuthal Doppler shirt in light beams with orbital angular momentum," Opt. Commun. 112, 141–144 (1994).

J. Courtial, K. Dholakia, L. Allen, M. J. Padgett, "Gaussian beams with very high orbital angular momentum," Opt. Commun. 144, 210–213 (1997).

A. E. Siegman, Lasers (University Science Books, CA USA, 1986).

R. L. Phillips, L. C. Andrew, Spot size and divergence for Laguerre Gaussian beams of any order Apl. Opt. 22, 643–644 (1983).

* cited by examiner

EFFICIENT SYSTEM AND METHOD FOR MEASURING TARGET CHARACTERISTICS VIA A BEAM OF ELECTROMAGNETIC ENERGY

BACKGROUND OF THE INVENTION

1. Field of Invention

This invention relates to active mode sensor systems. Specifically, the present invention relates to coherent active mode sensor systems employing lasers, radars, infrared, microwave, or other type of electromagnetic energy to measure target rotation and range.

2. Description of the Related Art

Active mode sensor systems, such as ladar (laser radar) systems, are employed in various applications including high-resolution 3-dimensional imaging, mapping, chemical analysis, atmospheric analysis, and military targeting applications. Such applications require accurate, space-efficient, and cost-effective ladar systems that can effectively detect and identify a target. The ladar systems must effectively reduce or cancel signal interference, such as platform noise, background clutter, and atmospheric distortion inherent in laser return signals.

An exemplary ladar system includes a sensor suite mounted on a satellite, missile system, aircraft, tank, or other vehicle. The sensor suite has one or more fixed physical apertures through which the ladar system views a scene. The ladar system views the scene by transmitting a laser through the aperture toward the scene. The laser reflects off the scene, producing a laser return that is detected by the ladar system. Many conventional radar and ladar systems measure the intensity of the return beam and the round trip delay from transmission to detection, which yields the distance (range) to the scene. Laser return intensity and range information may be combined with other image information to facilitate target tracking, terrain mapping, atmospheric analysis, and so on.

Ladar systems are either coherent or noncoherent. Coherent ladar systems transmit a laser beam with a predetermined phase and frequency. Knowledge of the spectral characteristics of the transmitted laser beam enables coherent ladar systems to record additional information about the scene, such as target movement and velocity (range rate), and to further improve Signal-to-Noise Ratio (SNR) over corresponding noncoherent ladar systems.

Accurate and efficient radar and ladar systems are particularly important in targeting applications, such as air-to-air combat and missile defense systems, where undesirable noise from atmospheric distortion, platform vibration and background reflections (clutter) is common. Such noise often degrades target detection and tracking accuracy and prohibits effective target vibration sensing.

To reduce undesirable noise, some ladar systems include complex platform stabilization systems to reduce platform vibrations. These platform stabilization systems are often undesirably expensive and bulky and often inapplicable to missile and aircraft applications, where platform noise is difficult or impossible to eliminate. Furthermore, platform stabilization systems typically do not cancel noise due to background clutter or atmospheric distortion of the ladar beam.

To reduce atmospheric distortion and related noise, some ladar systems employ complex electronic hardware and software to perform statistical analysis on the atmosphere to estimate and eliminate the atmospheric noise component in the laser return signal. Unfortunately, statistical atmospheric analysis is often prohibitively expensive and may not sufficiently reduce atmospheric noise for some applications. Furthermore, statistical atmospheric analysis does not typically reduce platform noise.

To reduce both platform noise and noise due to atmospheric distortion and/or background clutter, ladar systems may also employ special noise reduction filters and corresponding systems. These filters may be undesirably expensive and bulky for applications with stringent space constraints, such as missile ladar system applications. Furthermore, such filters often cannot lower noise to acceptable levels required for accurate target tracking.

Alternatively, platform noise, atmospheric noise, and clutter may be reduced by employing independent lasers transmitting at different wavelengths. Noise effects common to both lasers are subtracted from the target return signals as common mode noise. Unfortunately, ladar systems employing two independent lasers are often prohibitively expensive and bulky.

Furthermore, conventional coherent ladar systems, which often employ Gaussian or Hermite-Gaussian laser beams, cannot accurately measure target rotation. Valuable target data based on the target rotational signature, such as target type, is often unavailable due to the nature of the transmitted laser beams and due to undesirable noise in the laser return signals. Target motion detection with conventional active mode sensor systems is often limited to longitudinal Doppler or target range rate.

Some conventional ladar systems that measure target longitudinal Doppler can infer certain target rotational characteristics when the target rotational axis is not parallel to the laser beam axis. In this case, target rotational motion appears as Doppler phase shifts that are spread about the mean longitudinal Doppler phase shifts associated with the laser returns. The Doppler phase shifts must be analyzed to indirectly infer certain target rotational characteristics. Conventional active mode sensor systems cannot directly measure target rotational rates independent of longitudinal motion. Consequently, such systems are often inapplicable in many important applications, including direct sensing of atmospheric and ocean surface vortices and hard target torsion modes related to target vibration and flexures.

Hence, a need exists in the art for a space-efficient and cost-effective system and method for effectively reducing or eliminating noise, such as platform noise, atmospheric distortion, and background clutter, from return signals in active mode sensing applications. There exists a further need for a system that can effectively measure target rotation to more clearly identify and analyze the target based on target rotational signature.

SUMMARY OF THE INVENTION

The need in the art is addressed by the efficient system for measuring target characteristics via a torsion mode beam of electromagnetic energy of the present invention. In the illustrative embodiment, the inventive system is adapted for use with active ladar sensors. The system includes a first mechanism for transmitting a torsion mode beam of electromagnetic energy toward a target. A second mechanism receives a corresponding return beam the electromagnetic energy after reflection from the target and provides a first signal in response thereto. A third mechanism measures rotational characteristics of the target based on the first signal.

In a specific embodiment, the system further includes a fourth mechanism for reducing or eliminating noise in the return beam based on the target rotational characteristics via common mode rejection. A fifth mechanism identifies the type of the target based on the target rotational characteristics via comparison to predetermined target rotational signatures. An additional mechanism selectively alters the mode of the beam of electromagnetic energy between a first mode and a second mode.

The second mechanism includes a detector and a local oscillator. The detector is electrically divided. The local oscillator provides a Gaussian or Laguerre-Gaussian beam for mixing with the first mode and the second mode at the detector to yield corresponding beat frequencies. The first mechanism and second mechanisms employ a transceiver associated with a transmit chain and a receive chain. The transmit chain includes a time-division multiplexer or a spatial multiplexer for selectively transmitting the beam of electromagnetic energy with modes alternating between the first and second modes, or for selectively transmitting first and second spatially separated beams characterized by the first and second modes, respectively. The receive chain includes a corresponding time-division demultiplexer or spatial demultiplexer, respectively, for providing the first signal.

In a more specific embodiment, the second mode is a Gaussian mode. Alternatively, the second mode is a Laguerre-Gaussian torsion mode that is characterized by a mode index different from the first Laguerre-Gaussian torsion mode. Alternatively, the first mode is a left-handed Laguerre-Gaussian torsion mode, and the second mode is a right-handed Laguerre-Gaussian mode.

The third mechanism includes mechanism for determining rotational Doppler $f_{Doppler}$ due to reflection of the beam of electromagnetic energy from the target. The rotational Doppler $f_{Doppler}$ given by the following equation:

$$f_{Doppler} = \frac{m\Omega}{\pi},$$

where m is the mode order of the Laguerre-Gaussian beam of electromagnetic energy. $\Omega$ is the rotational rate at which the target rotates about a beam axis of the target determination system.

The novel design of the present invention is facilitated by the first and second mechanisms, which implement coherent detection of a torsion mode beam transmitted toward a target and reflected from the target. The torsion content of the torsion mode beam is shifted upon reflection from the target. This shift is used to measure target rotation. By isolating signal components associated with target rotation, common mode noise sources that do not exhibit significant torsion, such as platform vibration and atmospheric distortion are thereby made common mode and, consequently, eliminated. Hence, accurate and direct measurements of target rotation are now possible via the present invention. These direct target rotation measurements facilitate target type identification, tracking, and analysis, and may dramatically improve overall performance of active sensor systems.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
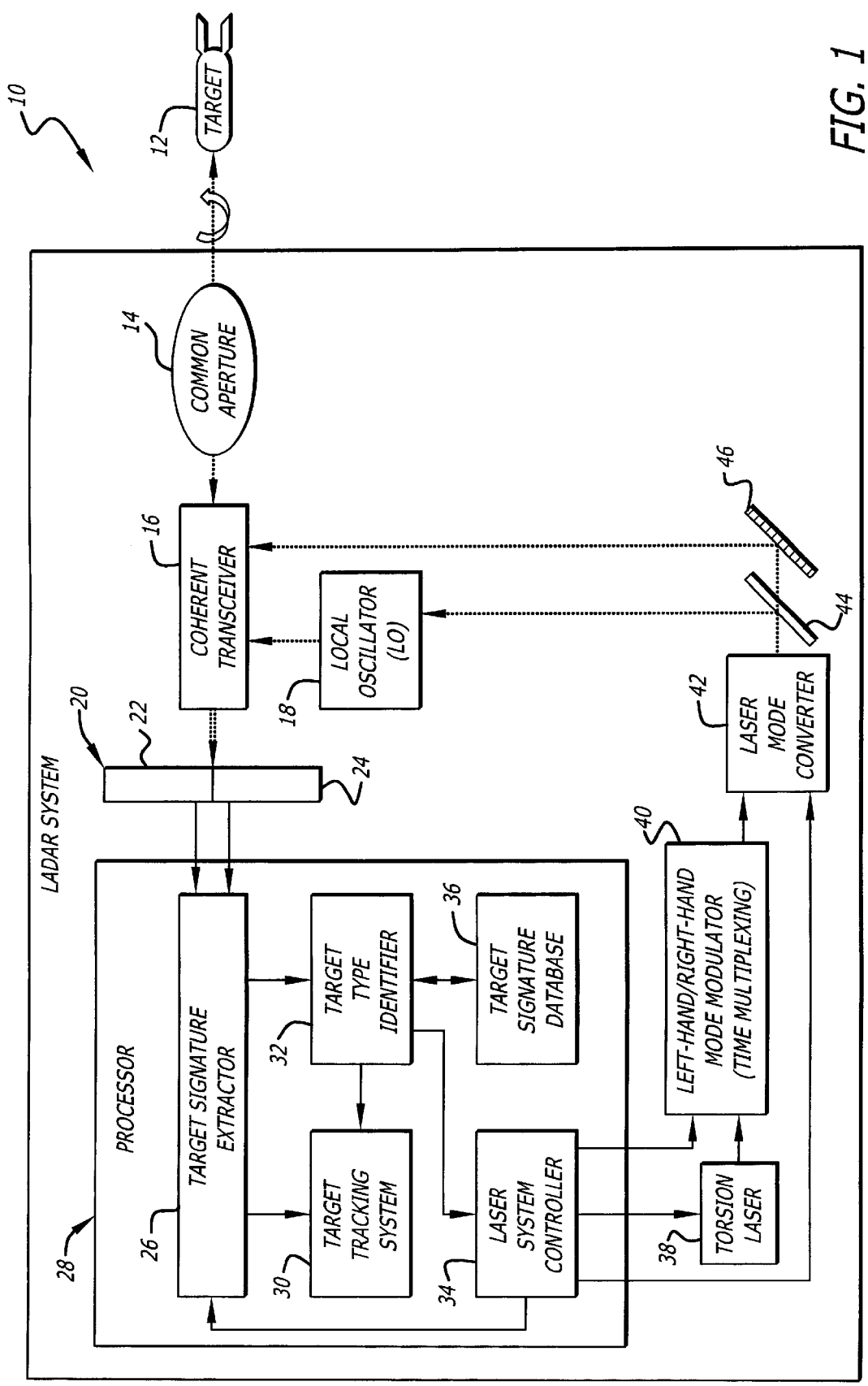
FIG. 1 is a diagram of a first embodiment of a ladar system of the present invention that employs a torsion mode laser beam and time multiplexing to facilitate target detection, identification, and tracking via target rotation information.

FIG. 1 is a diagram of a first embodiment 10 of a ladar system of the present invention that employs a torsion mode laser beam and time multiplexing to facilitate detection, identification, and tracking of a target 12 via target rotation information. For clarity, various well-known components, such as power sources, signal amplifiers, noise filters, and focusing optics have been omitted from FIGS. 1 and 3, however those skilled in the art with access to the present teachings will know which components to implement and how to implement them to meet the needs of a given application.

The ladar system 10 is a monostatic ladar system that includes a transceiver 16 having a receiver and a transmitter that share a common aperture 14. The transceiver 16 transmits laser signals toward the target 12 and receives corresponding return signals reflected from the target 12. The common aperture 14 may be implemented as a conventional ladar telescope.

The ladar system 10 includes a local oscillator 18, which provides an optical reference signal to the coherent transceiver 16. A dual-mode optical detector 10 includes a first detector section 22 and a second detector section 24 for receiving return beams of different modes from the coherent transceiver 16. The dual-mode detector 20 provides first and second electrical signals output from the first and second detector sections 22 and 24, respectively, to a target signature extractor 26 running on a ladar system processor 28.

The ladar system processor 28 includes the target signature extractor 26, a target tracking system 30, a target type identifier 32, a laser system controller 34, and a target signature database 36. The target signature extractor 26 provides output to the target tracking system 30 and the target type identifier 32. The target type identifier 32 provides output to the target tracking system 30 and to the laser system controller 34 and communicates with the target signature database 36. The laser system controller 34 provides control input to a torsion mode laser 38, a left-hand/right-hand (LH/RH) mode modulator 40, and a laser mode converter 42. The torsion mode laser 38 provides optical output to the LH/RH mode modulator 40, which provides optical output to the laser mode converter 42. Optical output from the laser mode converter 42 is input to the local oscillator 18 and the coherent transceiver 16 via a beam splitter 44 and a mirror 46.

In operation, the torsion laser 38, which is controlled by the laser system controller 34, generates a torsion mode laser beam having orbital angular momentum. In the present specific embodiment, the torsion mode laser beam is a Laguerre-Gaussian torsion mode laser beam. Those skilled in the art will appreciate that another type of torsion mode beam, such as an appropriate mode RADAR beam may be employed for the purposes of the present invention without departing from the scope thereof.

For the purposes of the present discussion, a torsion mode beam is a beam of electromagnetic energy having, an energy component that circulates around an axis (not necessarily the beam axis) as the beam propagates, having an orbital angular momentum component. Beam torsion is independent of beam polarization. For example, a linearly polarized beam may contain torsion. A circularly polarized beam does not necessarily contain torsion.

The mode of the torsion mode laser beam is selectively switched between left-handed and right-handed torsion modes by the LH/RH mode modulator 40, which is also controlled by the laser system controller 34. The LH/RH mode modulator 40 performs time multiplexing on the torsion mode laser beam output by the torsion laser 38 by transmitting a left-handed torsion mode beam at time intervals $T_i$ (where i is an even integer index) and transmitting right-handed torsion mode beams at adjacent time intervals $T_j$ (where j is an odd integer index). The lengths of the time intervals $T_i$ and $T_j$ are application-specific and are predetermined by the laser system controller 34 or via user input from a user-input device (not shown) in communication with the laser system controller 34 and/or the LH/RH mode modulator 40. The target signature extractor 26 is preconfigured or is automatically configured in response to timing feedback from the laser system controller 34 to accommodate the time interval lengths when processing target return signals.

The LH/RH mode modulator 40 alternately provides a left-handed torsion mode laser beam and a right-handed torsion mode laser beam to the laser mode converter 42. The laser mode converter 42 selectively switches the mode of the left-handed and right-handed torsion mode laser beams between a Laguerre-Gaussian mode and a Gaussian mode at predetermined time intervals. The times at which mode switching between Laguerre-Gaussian mode and Gaussian modes occur are predetermined by the laser system controller 34 or set via predetermined input, such as via user-input. The times at which the mode switching occurs are known by the target signature extractor 26, which facilitates return signal processing.

The LH/RH mode modulator 40 and the laser mode converter 42 may be implemented via liquid crystal holograms or mechanically switched optical paths with different cylindrical lenses. Those skilled in the art with access to the present teachings will know how to implement the LH/RH mode modulator 40 and the laser mode converter 42 without undue experimentation.

The laser mode converter 42 provides an output laser beam to the local oscillator (LO) 18 via the beam splitter 44 and to the coherent transceiver 16 via the beam splitter 44 and the mirror 46. The beam splitter 44 splits off a small fraction of the laser beam output from the laser mode converter 42 and directs the fractional beam to the local oscillator 18. The remaining portion of the beam passes through the beam splitter 44 and reflects from the surface of the mirror 46 to the coherent transceiver 16. Those skilled in the art will appreciate that the input to the local oscillator 18 may come from a different source other than the laser mode converter 42, such as a source that is independent of the torsion laser 38 without departing from the scope of the present invention. Furthermore, the beam splitter 44 and the mirror 46 may be omitted or employed in a different arrangement, without departing from the scope of the present invention.

The LO 18 derives a reference signal from the output of the laser mode converter 42. Circuits and methods, such as phase-locked-loops, for deriving a reference signal from an input signal are known in the art. The resulting LO reference signal is input to the coherent transceiver 16, which directs the signal onto the surface of the detector 20. The LO 18 and the detector 20 are shown as separate from the coherent transceiver 16 for illustrative purposes, however, in many applications, the LO 18 and the detector 20 are considered part of the coherent transceiver system 16, which may include plural local oscillators.

The beam output from the laser mode converter 42 may be a left-handed or right-handed Laguerre-Gaussian torsion mode beam or a normal Gaussian beam depending on the time as determined by the laser system controller 34. The coherent transceiver 16 prepares the beam, which is output from the laser mode converter 42 and reflected from the mirror 46, for transmission through the common aperture 14 toward the rotating target 12. The coherent transceiver 16 may include optical amplifiers and other optics (not shown) to prepare the beam for transmission through the common aperture 14. The common aperture 14 may be implemented via a conventional ladar system telescope.

The coherent transceiver 16 transmits a laser beam that is based on the output of the laser mode converter 42 toward the target 12 via the common aperture 14. The transmitted beam then reflects from the target 12, yielding a laser return that is received by the coherent transceiver 15 via the common aperture 14. The coherent transceiver 16 may perform filtering and signal amplification on the laser return before the return beam is mixed with the reference signal from the LO 18 on the surface of the detector 20. In the present specific embodiment, the detector 20 is disc-shaped and is divided evenly in half between the first section 22 and the second section 24.

When the coherent transceiver 16 alternately transmits left-handed and right-handed Laguerre-Gaussian torsion mode beams toward the target 12, the detector 20 receives corresponding left-handed and right-handed return beams, respectively. The left-handed and right-handed return beams mix with the LO reference on the surfaces of the detector which, in the embodiment, is electrically divided into section 22 and section 24. This is necessary, as the phase surfaces of the Laguerre-Gaussian mode are helical. Hence, by differencing the two detector halves (22 and 24), the beat signal is recovered. The target signature extractor 26 performs the necessary operations to extract the target information from the first detector section 22 and the second detector section 24, which detect beat frequencies resulting from the mixing of the LO reference and the return signals. In the present embodiment, the target signature extractor 26 acts as a time demultiplexer when left-handed and right-handed Laguerre-Gaussian return beams alternately impinge on the detector 20. The difference between the right-handed and left-handed beat signals is related to the target torsional Doppler. The sum of the right-handed and left-handed beat signal is related to the longitudinal Doppler.

The difference between the electrical signals output by the detector 20 corresponding to left-handed and right-handed torsion mode return beams yields a component representative of the rotational characteristics of the target 12 along the line of sight of the ladar system 10 as viewed through the common aperture 14, as discussed more fully below.

The target signature extractor 26 typically includes a buffer, register, delay, or other memory unit(s) (not shown) to collect left-handed and right-handed torsion mode return signals and subtract them from corresponding right-handed and left-handed torsion mode return signals, respectively. The output of the memory unit(s) are provided to a subtractor (not shown), implemented in software or hardware, which subtracts the left-handed torsion mode return beams from the corresponding right-handed torsion mode return beams or visa versa. This difference signal is proportional to the target rotation spectrum and is independent of the longitudinal Doppler (range rate) and platform and atmospheric piston noise.

The target signature extractor 26 forwards resulting target rotational characteristics (torsion characteristics) to the target type identifier 32. The target type identifier 32 matches the measured target rotational characteristics with known target rotational signatures, which are stored in the target signature database 36, to determine the type of the target 12. Different hard targets, such as different missiles and aircraft, and soft targets, such as hurricanes, tornadoes, and so on, have distinct rotational signatures, which may be stored in the target signature database 36 for easy target type-identification by the target type identifier 32.

Knowledge of the type of the target 12, such as a surface-to-air missile or cruise missile, enables the target-tracking system 30 to fine-tune certain target-tracking or ladar system steering parameters. The target tracking system 30 may also employ target rotational characteristics directly from the target signature extractor 26 to facilitate target tracking. Furthermore, the laser system controller 34 may adjust the frequency at which the LH/RH mode modulator 40 and the laser mode converter 42 switch laser modes in response to target type information.

The target tracking system 30 may be implemented in software running on the processor 28. Alternatively, the target tracking system 30 may be implemented via a computer (not shown) separate from the processor 28 and may be replaced with a another type of system, such as an atmospheric analysis, surveillance, and/or mapping system, without departing from the scope of the present invention. The computer for analyzing ladar system data may be separate from the ladar system 10. In this case, the ladar system 10 may communicate wirelessly with the target tracking system computer or may only collect data to be analyzed later.

Those skilled in the art will appreciate that the target signature extractor 26 may be adjusted to compute target range rate, range, and target torsion from Laguerre-Gaussian torsion mode beams alone without departing from the scope of the present invention. Furthermore, the target tracking system 30, the target type identifier 32, and/or the target signature database 36 may be omitted from the ladar system 10 without departing from the scope of the present invention. In addition, those skilled in the art will appreciate that the torsion principles of the present invention may be adapted for use with radar, microwave, infrared, or other types of electromagnetic energy without departing from the scope of the present invention. Furthermore, while the ladar system 10 of the present embodiment is a monostatic ladar system (since transmit and receive sections in the coherent transceiver 16 share the common aperture 14), the system 10 may be implemented as a bistatic sensing system without departing from the scope of the present invention. In addition, the relative positions, i.e., order of the laser mode converter 42, the LHJRH mode modulator 40, and the torsion laser 38 may be changed.

Although the present invention is discussed with reference to a hard rotating target 12, the present invention is applicable to soft target detection and tracking. For example, the concepts of the present invention are applicable to analyzing ocean currents, atmospheric circulation patterns, and so on. In addition, the detector 20 may be replaced with another type of detector, such as a detector divided into quadrants instead of in half, depending on the order of the modes received by the detector 20. For example, certain torsion laser modes will cause four different circulation patterns within the beam, one pattern per quadrant, which may require a different type of detector. Alternatively, the detector 20 may be replaced with a detector having a single detector section instead of two or more detector sections. In this case, the received laser signal would be time-demultiplexed via additional software incorporated into the target signature extractor 26 instead of by the detector 20 itself, and the detector integration region would certain well-known, application-specific adjustments.

For the purposes of the present discussion, a beam of electromagnetic energy has torsion when a component of the beam energy circulates around an axis (not necessarily the beam axis) as it propagates. Torsion beams have orbital angular momentum as well as spin. The torsion component is independent of polarization. For example, a linearly polarized beam wherein the electric field oscillates in a fixed plane may contain torsion. Consequently, the functions describing the electric and magnetic fields of the beam must contain a term that is dependent on the azimuthal angle.

A rotating target, such as the target 12, will produce an amplitude term from speckle translation (in response to a circularly polarized beam) that is related to both the target rotational rate and the wavelength of the transmitted beam. However, a torsion mode beam will yield a frequency shift term (rotational Doppler term) that is independent of amplitude (it is not a speckle phenomenon) and frequency, as discussed more fully below.

The system 10 is a coherent system employing torsional demodulation. In the present specific embodiment, the system 10 employs the torsion mode laser 38 beam for both the transmitter of the transceiver 16 and the local oscillator 18. The ladar system 10 employs coherent detection principles to detect a torsion mode return beam. The ladar system 10 may directly measure target rotational rates by using a torsion mode beam. Torsional phase information in the laser return beam is used to determine target dynamics. The phase rate of the torsion mode is modified upon reflection from the rotating target 12. This change in phase is detected by the coherent mixing process on the detector 20 and is manifested as a beat frequency.

In addition to torsional Doppler, the longitudinal Doppler component (conventional Doppler component) is also manifested in the torsion mode return beam. These two components are separated by the target signature extractor 26 through sum and difference processing of the left handed and right handed mode returns. The longitudinal Doppler is inversely proportional to the laser wavelength, while the torsional Doppler is independent of wavelength.

Laser torsion modes occur when the laser cavity of the torsion laser 38 has a preferential gain in a Laguerre-Gaussian mode as opposed to a conventional Gaussian or Hermite-Gaussian mode. The Laguerre mode is characterized by a phase term, which is proportional to the azimuthal angle about the beam axis. The Laguerre-Gaussian mode may be excited with an intracavity phase plate (not shown) in the torsion laser 38.

Mode converters that convert Hermite to Laguerre modes are well known in the art and are reciprocal devices. For example, such devices are described in articles in *Optics News*, February 1999, Volume 10, page 40 and in the *American Journal of Physics*, January 1999, Volume 67, page 55, and January 1996, Volume 64, page 77.

In a particular implementation, the phase plate is a glass or paraffin plate that is shaped like a helix. The depth of the helix imparts an appropriate phase delay to the beam. These devices have been built and tested at millimeter wave frequencies. The helical phase plate may be immersed in an index-matching fluid, where the index of the fluid is a function of an applied electric field (a liquid crystal). Alternatively, an appropriate phase plate can be made to work intracavity, which when coupled with an appropriate amplitude filter would force a laser resonator to oscillate in a pure torsion mode.

The coherent system 10 operates in a specific torsion mode and employs coherent detection via a similar torsion mode, yielding a beat frequency in response thereto. The target signature extractor 26, which may be implemented in software by one skilled in the art with access to the present teachings, extracts target rotation measurements about the optical axis of the common aperture 14 based on beat frequency at the detector 20. As discussed more fully below, the beat frequency is independent of the frequency and carrier frequency of the transmitted beam of the coherent ladar system 10.

In the present specific embodiment, the Laguerre-Gaussian torsion mode laser beams transmitted toward the target 12 by the coherent transceiver 16 have wave-front singularities, which are also called optical vortices, helicoidal wave-fronts, holes, or singular optics. Certain target properties, such as reflectance, range extent, target longitudinal motion (including longitudinal vibration), and target rotation affect properties of the backscattered laser return beam. The ladar system 10 directly measures spatially resolved target rotational motion independently of target longitudinal motion by exploiting the interaction between target angular velocity and beam orbital angular momentum. The beam orbital angular momentum changes upon reflection from the rotating target 12, and the change is proportional to the angular velocity of the target 12 and the sense (left or right handedness) of the torsional mode. This torsional Doppler shift is a direct measurement of target torsional states, including the state wherein the rotational axis of the target 12 is parallel to the axis of the transmitted laser beam, which corresponds to the optical axis of the common aperture 14. The ladar system 10 interrogates the target 12 with both a left-handed and right-handed helicoidal phase mode (torsion mode), which enables target torsional motion computation by difference processing via the target signature extractor 26. The difference processing is independent of longitudinal Doppler. The longitudinal Doppler is extracted by sum processing via the target signature extractor 26.

In the present specific embodiment, the Laguerre-Gaussian torsion mode laser beams transmitted toward the target 12 by the ladar system 10 have complex field amplitudes given by the following equation:

$$\tilde{u}_{pm}(r,\theta,z) = \sqrt{\frac{2p!}{(1+\delta_{0m})\pi(m+p)!}} \quad [1]$$

$$\frac{1}{\omega(z)} \cdot e^{i(2p+m+1)(\psi(z)-\psi_o)} \left(\frac{\sqrt{2}r}{\omega(z)}\right)^m L_p^m\left(\frac{2r^2}{\omega(z)^2}\right) \cdot e^{\left(-ik\frac{r^2}{\omega(z)}+im\theta\right)},$$

where $L_p^m(x)$ is the $(p,m)^{th}$ Laguerre polynomial where p and m are mode integers, where m is the torsional mode order, and p is the radial mode order. r, $\theta$ and z are standard polar coordinates, where r is a radial distance variable; $\theta$ is an angular position variable (azimuth); and z is a position variable parallel to the direction of propagation of the beam, which is coincident with the optical axis of the ladar system 10. k is the propagation vector (also called the wavenumber or propagation constant). $\psi_o$ is a fixed phase. $\psi(z)$ is the Gouy phase. $\omega(z)$ is given by the following equation:

$$\omega(z) = \omega_0 \sqrt{1+\left(\frac{z}{z_r}\right)^2} \quad [2]$$

$$z_r = \frac{\pi \omega_0^2}{\lambda},$$

where $\lambda$ is the wavelength of the beam, and $\omega_0$ is the laser beam waist at z=0. Equation (1) is described more fully in a book by A. E. Siegman, entitled LASERS, published by University Science Books, CA USA, 1986.

In the special case when p=0 and m≧1, $L_0^m(x)$=1. In this case, all (p=0,m) Laguerre-Gaussian modes have similar radial energy distributions due to an $r^m$ dependence. However, the fixed angular divergence in the far field has a $(1+m)^{i/2}$ dependence as discussed in an article by R. L. Phillips and L. C. Andrew, entitled "Spot size and divergence for Laguerre Gaussian beams of any order." published in *Applied Optics*, Volume 22, pages 643–644 (1983).

The helical phase of the torsion mode beam is described by the last term (Exp(im$\theta$)) of equation (1), as given below:

$$\text{Exp}(im\theta) = L_p^m\left(\frac{2r^2}{\omega(z)^2}\right) \cdot e^{\left(-ik\frac{r^2}{\omega(z)}+im\theta\right)}, \quad [3]$$

where the variables are as described above. The field polarization is fixed and linear, such as along the x-direction, which is horizontal and perpendicular to the optical axis of the ladar system 14. In the present embodiment, the target 12 is non-depolarizing.

Physically, for fixed polarization, the orbital angular momentum is carried by circulation of the fields about the optical axis (the z-axis), making approximately m circuits for every advance of $\lambda$ (wavelength) meters. The actual circulation of energy is determined by the Gouy phase term (2p+m+1)$\psi$(z), as well as the m$\theta$ product term. Hence, there is a z dependence on the rate of rotation of the field energy. However, in the far field $\psi(z) \rightarrow \pi/2$, a constant, where the phase advance is then determined by the m$\theta$ term alone. Scattering from a non-depolarizing, specular, or diffuse rotating target induces a change in the circulating phase rate which physically corresponds to a (rotational or azimuthal) Doppler shift.

Torsional motion of the target 12 imparts a torsional Doppler shift to the Laguerre-Gaussian torsion mode beam (transmit beam) transmitted from the transceiver 16 toward the target 12. This torsional Doppler shift is a frequency shift in the transmit beam due to interaction between the azimuthal (θ) and time coordinates for uniformly rotating frames as seen with reference to the well-known Lorentz transformations between a stationary (inertial) observer and a rotating observer.

In addition to torsional Doppler, the transmit beam may experience longitudinal Doppler upon reflection from the target 12 from target piston motion. The sense of the torsional Doppler shift is frame dependent such that the left-handed or right-handed beams have different Laguerre-Gaussian mode screw senses. Consequently, torsional Doppler may be separated from longitudinal Doppler via two measurements, assuming that the target dynamics are invariant during the dual measurement time interval.

When the transmit beam is a right-handed Laguerre-Gaussian beam and is followed by a left-handed Laguerre-Gaussian beam, the difference of the spectral content of the corresponding return beams represents torsional Doppler. while the sum of the spectral content represents longitudinal Doppler caused by target piston motion, such as longitudinal vibration. In addition to torsional Doppler, the longitudinal Doppler is measured by the target signature extractor 26 to facilitate target type identification and target tracking by the target type identifier 32 and tracker 30, respectively.

The transfer of angular momentum between the target 12 and the transmit beam facilitates remote measurement of the rotational dynamics of the target 12. The torsion content of the transmit torsion mode beam changes upon reflection from the rotating target 12. The change is represented by the rotational Doppler, i.e., torsional Doppler ($f_{doppler}$) given by the following equation:

$$f_{Doppler} = \frac{m\Omega}{\pi}, \quad [4]$$

where the rotational Doppler $f_{Doppler}$ is due to reflection of the transmit beam from the target 12, which is rotating about the beam axis at a rotational rate of Ω cycles per second. m is the beam order. Hence, the rotational Doppler is independent of the wavelength of the laser beam and is proportional to the torsion beam order m.

By employing the laser mode converter 42 to selectively modulate m, the ladar system 10 may employ matched filter techniques to enhance detection of target torsion rates Ω and to further separate target rotational and translation dynamics. Selective modulation of m may facilitate separation of rotational and transnational dynamics, since the transnational offset (longitudinal Doppler) is independent of the torsion mode index m. Applicable matched filter techniques, which are well known in the art may be implemented via the target signature extractor 26.

The coherent ladar system 10 measures torsional Doppler by sensing chances in laser beam torsion caused by the target 12. If the target 12 is translating and rotating relative to the ladar system 10, both rotational Doppler and transnational Doppler occur. The torsion mode beam does not decouple the rotational and longitudinal motions. However, a beam without torsion will not experience the rotational Doppler upon reflection from the target 12. The difference in frequency between a transnational Doppler measurement determined from a conventional Doppler ladar and a torsion beam Doppler measurement is the rotational Doppler as given in equation (4).

In the present specific embodiment, the local oscillator 18 outputs a Laguerre-Gaussian beam that is similar to local oscillator input beam received from the laser mode converter 42 via the beam splitter 44 and local oscillator 18. Alternatively, the local oscillator 18 may output a normal Gaussian beam that may or may not be derived from the output of the torsion laser 38.

When the transceiver 16 and the local oscillator 18 output Laguerre-Gaussian (p=0, m=1) beams, the spatial beam patterns ($L\xi_T(\rho)$ and $L\xi_L(\rho)$) at the common aperture 14 (objective) and the detector 20 are approximated by the following equations, respectively:

$$L\xi_T(\rho) = \sqrt{\frac{2}{\pi\omega_T^2}} |\rho|\exp(-|\rho|^2(\omega_T^{-2} + ik/2R) + i\theta) \quad [5]$$

$$L\xi_L(\rho) = \sqrt{\frac{2}{\pi\omega_{DL}^2}} |\rho|\exp(-|\rho|^2(\omega_{DL}^{-2} - ik/2l) + i\theta), \quad [6]$$

where $L\xi_T$ is the beam pattern at the detector 20 corresponding to the beam transmitted toward the target 12 via the transceiver 16. $L\xi_L$ is the local oscillator beam pattern at the detector 20. ρ is a transverse coordinate vector (e.g. (x,y)). $\omega_T$, $\omega_{DL}$ are the 1/$e^2$ intensity radii of the transceiver and local oscillator beams, respectively. R is the phase radius of curvature of the transmit beam at the pupil of the objective 14. k is the wavenumber; θ is a phase term; and i is the pure imaginary number such that $i_2$=−1.

In the alternative case wherein the local oscillator 18 outputs a Gaussian beam, the local oscillator spatial beam pattern at the detector 20 is given by:

$$\xi_L(\rho) = \sqrt{\frac{2}{\pi\omega_{DL}^2}} \exp(-|\rho|^2(\omega_{DL}^{-2} - ik/2l)), \quad [7]$$

where the variables and constants are as described above.

Based on equations (5), (6), and (7), when the local oscillator 18 outputs a Gaussian beam, and the coherent transceiver 16 outputs a Laguerre-Gaussian beam, the preferred size parameters for the detector 20 and the beam transmitted by the transceiver 16 are:

$$\mu_T = \frac{4\omega_T}{D}, \mu_L = \frac{4\omega_L}{D}, \gamma = \frac{Dd}{2\lambda f}, \quad [8]$$

where $\mu_T$ and $\mu_L$ are dimensionless measures of the beam diameters of the Laguerre-Gaussian torsion mode beam and the Gaussian beam transmitted by the transceiver 16 and local oscillator 18, respectively, relative to the diameter D of the ladar aperture (objective) 14. γ is a measure of the size of the detector 20 relative to the diffraction (spot) size of the pupil of the objective 14 in the plane of the detector 20. Consequently, as γ→0 the detector 20 becomes a point, and encircles zero energy. d is the diameter of the detector 20. f is the focal length of the objective 14. λ is the wavelength of the beam output by the transceiver 16. The factor of four scales $\mu_T$ and $\mu_L$ so that when $\mu_T$≦1 and $\mu_L$≦1, the Gaussian beam is untruncated.

When the local oscillator 18 outputs a Gaussian beam, and the coherent transceiver 16 outputs a Laguerre-Gaussian beam (the LG transmitter and Gaussian local oscillator case), the speckle target coherent detection mixing efficiency ($\epsilon_{het}^S$) is approximately:

$$\varepsilon_{het}^S = 2\pi^2 \left(\frac{\pi\mu_T}{2}\right)^2 \left(\frac{\pi\mu_L}{2}\right)^2 \frac{\int_0^\infty x\,dx |L\eta_\infty^T(x)|^2 |\eta_\gamma^L(x)|^2}{1-\exp(-(\pi\mu_L\gamma)^2/8)} \quad [9]$$

$$L\eta_s^j(x) = 2\sum_{n=2,4,\ldots} \frac{nJ_n(\pi x)}{\pi x} \int_0^s dy J_n(\pi y)\sqrt{2}\,(\pi\mu_j y/4)\exp(-(\pi\mu_j y/4)^2).$$

where $J_n(x)$ is an $n^{th}$ order Bessel function of x. The index i=L or T to represent the transmitter and local oscillator terms, respectively. s=γ when i=L, and s=∞, when i=T. x and y are normalized target plane transverse coordinates. The remaining variables and constants are as described above. For the LG transmitter and Gaussian local oscillator case, the heterodyne mixing efficiency $\mu_T \cong 1.4$, $\mu_L \cong 1.4$ to 1.5, and γ≅1.5.

When the local oscillator 18 outputs a Laguerre-Gaussian beam, and the coherent transceiver 16 also outputs a Laguerre-Gaussian beam (the all LG beam ladar case), the speckle target mixing efficiency is approximately:

$$\varepsilon_{het}^S(x) = 2\pi^2 \left(\frac{\pi \mu_T}{2}\right)^2 \left(\frac{\pi \mu_L}{2}\right)^2 \frac{\int_0^{2\pi} d\theta \int_0^\infty x' \, dx' |\tilde{\eta}_\infty^T(z)|^2 |\eta_\gamma^L(x')|^2}{1 - \left(1 + \frac{(\pi \mu_L \gamma)^2}{8}\right) \exp(-(\pi \mu_L \gamma)^2/8)} \quad [10]$$

$$\tilde{\eta}_\infty^T(z) = \frac{\eta_\infty^T\left(\sqrt{x^2 + x'^2 - 2xx'\cos(\theta)}\right)}{2\pi}$$

$$\eta_\infty^T(z) = 2 \sum_{n=1,3,\ldots} \frac{n J_n(\pi z)}{\pi z} \int_0^\infty dx' J_n(\pi x') \exp(-(\pi \mu_T x'/4)^2),$$

where z is a coordinate in the direction of propagation of the beam. x and x' are transverse coordinates in a plane perpendicular to the front of the target 12 (target plane) such that $z=\sqrt{x^2+x'^2-2xx'\cos(\theta)}$. The remaining variables, constants, and functions are as described above. For the all LG beam case, $\mu_T \cong 1.2$, $\mu_L \cong 1.2$ to 1.4, and γ≅1.8.

Due to helical phase structure of the Laguerre-Gaussian transmit beam, if the detector 20 integrated θ through a full 2π, the heterodyne beat note would be integrated out. To avoid integrating out the heterodyne beat note resulting from the mixing of the beam output from the local oscillator 18 (local oscillator beam) and the return beam on the surface of the detector 20, the detector 20 is electrically divided. In the present embodiment, the disc-shaped detector 20 is divided in half, along a diameter. The target signature extractor 26 appropriately combines the signal output from the two halves 22 and 24 of the detector 20 to yield an electrical heterodyne beat signal.

In general, to ensure that the torsional phase component of the Laguerre-Gaussian transmit beam is appropriately integrated by the detector 20, the detector 20 must be appropriately electrically divided. The following detector-segmentation table shows how to segment the θ domain of the detector 20 to extract the heterodyne beat notes for various transmit and receive beam combinations:

In the all Laguerre-Gaussian case wherein the local oscillator 18 and the coherent transceiver 16 transmit with the same beam mode, the photo-current i(t) output by the detector 10 is given by $$i(t) = \frac{e\eta P(t)}{h\nu} = \frac{e\eta}{h\nu} |(E_{lo}(t) + E_s(t))|^2 \quad [11]$$

$$= \frac{e\eta}{h\nu} (\overline{E_{lo}^2} + \overline{E_s^2} + 2\,Re(\overline{E_{lo}E_s})\cos(\phi_{lo}(t) - \phi_s(t)),$$

where h is Plank's constant, and ν is the frequency of the beam such that hν is the energy of a photon in the beam. e is the unit of electron charge. η is the detector quantum efficiency. $E_{lo}(t)$ is the electric field of the local oscillator beam. $E_s(t)$ is the electric field of the Laguerre-Gaussian return beam. $\phi_{lo}(t)$ is the phase of the local oscillator beam. $\phi_s(t)$ is the phase of the Laguerre-Gaussian return beam. The overbar indicates a time average. Note that the time dependent terms are given by the difference in the phases of the local oscillator and the return signal beams.

Assuming that the target 12 has both rotational and translational (longitudinal) motion, and assuming perfect heterodyning, i.e., mixing, the photo-current frequency ($f_s$) of the laser return signal is given by:

$$f_s = f_{offset} \pm \left(2m\Omega + \frac{2V}{\lambda}\right), \quad [12]$$

where $f_{offset}$ is the local oscillator offset frequency, i.e., the frequency by which the local oscillator output beam is offset relative to the frequency of the transmit beam output by the transceiver 16. m is the mode number of the laser return signal. Ω is the rotational rate of the target about the optical axis of the common aperture 14. V is the longitudinal velocity of the target 12, and λ is the laser wavelength. The +/− depends on whether the local oscillator frequency offset ($f_{offset}$) is up-shifted or down-shifted, respectively, relative to the optical carrier frequency associated with the laser return signal.

To provide for a controlled intermediate frequency representing a beat note between the return beam and the local oscillator signal, the local oscillator (18) is often set at an offset frequency ($f_{offset}$). This may be accomplished through external cavity acousto-optic frequency shifting, or by using a separate laser and tuning the cavity by the desired offset amount.

The fields that impinge on the detector 20, which is a photo-detector, are the sum of the local oscillator and return signals. The photo-current is proportional to the photon flux power, which is proportional to the field squared (see equation (11)).

TABLE 1

|  | Gaussian Local Oscillator | Right-Handed Laguerre-Gaussian Local Oscillator | Left-Handed Laguerre-Gaussian Local Oscillator |
|---|---|---|---|
| Gaussian Transmit Signal | {0, 2π} | {0, π} − {π, 2π} | {0, π} − {π, 2π} |
| Right-Handed Laguerre-Gaussian Transmit Signal | {0, π} − {π, 2π} | {0, π/2} − {π/2, π} + {π, 3π/2} − {3π/2, 2π} | {0, 2π} |
| Left-Handed Laguerre-Gaussian Transmit Signal | {0, π} − {π, 2π} | {0, 2π} | {0, π/2} − {π/2, π} + {π, 3π/2} − {3π/2, 2π} |

The detector 20 cannot respond at optical frequencies. Consequently, the sum frequencies cannot be detected in the mixing process, and only the difference frequencies are detectable and output by the detector 20.

The use of coherent detection of laser torsion permits direct measurement of target torsion about the line-of-sight of the ladar system 10. The torsional rate $\Omega$ (see equation (4)) is manifested as a frequency offset in the beat between the laser return signal and the local oscillator laser beam in the coherent detection process.

Although the present invention has been discussed with respect to hard target sensing, given the coherent mixing efficiency, one skilled in the art may readily adjust the ladar system 10 to examine soft target performance (aerosol scattering). The resulting system could measure vortical (torsional) motion in the atmosphere, including wind shear, and vortices related to aircraft motion and weather phenomena. One skilled in the art may establish a reasonable spatial resolution for the ladar system for a particular application with reference to composite antenna patterns.

Figure 2:
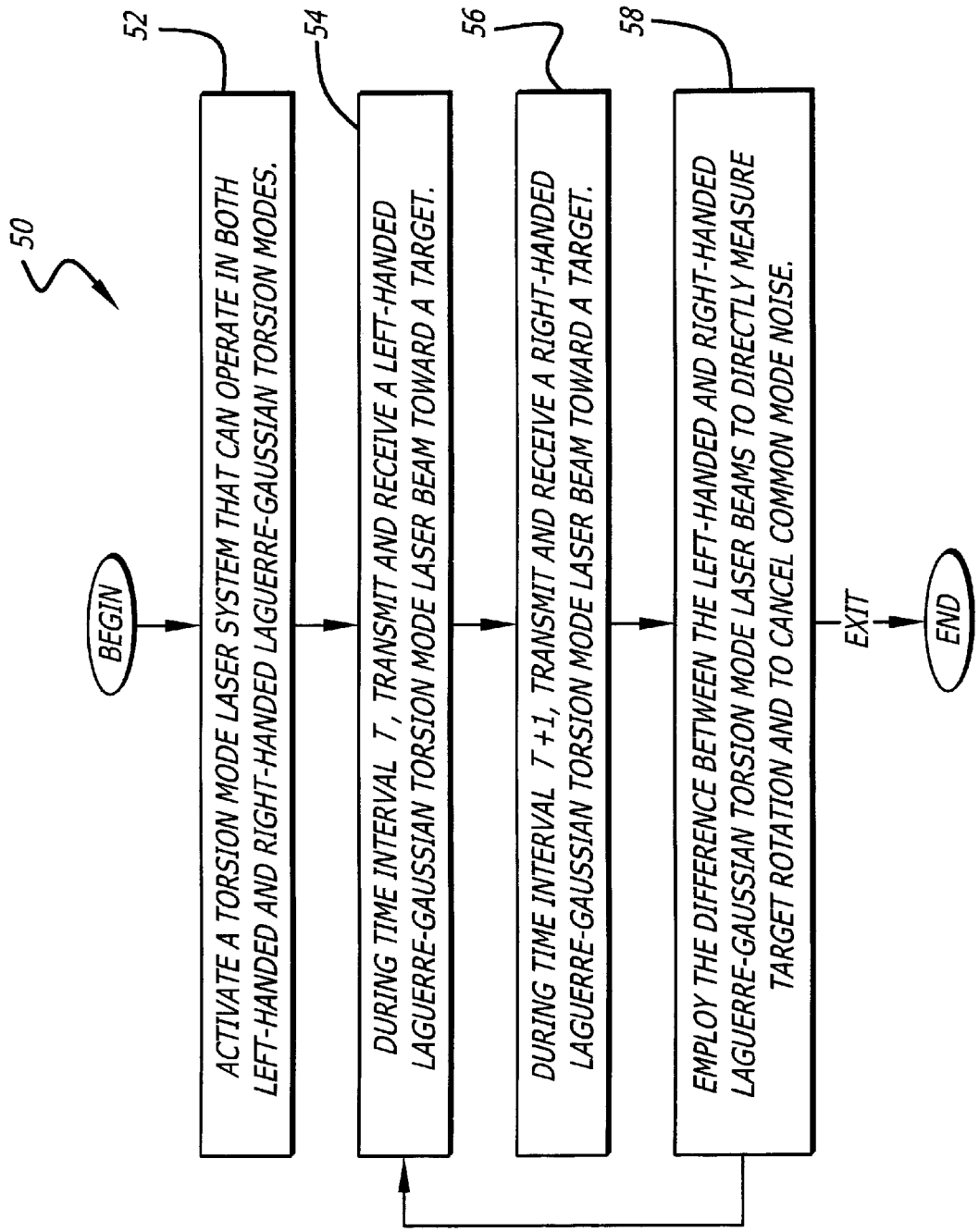
FIG. 2 is flow diagram of a method employed by the ladar system of FIG. 1 to measure target rotation to accurately detect a target while canceling external noise via common mode rejection.

FIG. 2 is flow diagram of a method 50 employed by the ladar system 10 of FIG. 1 to measure rotational characteristics of the target 13 and to accurately detect the target 12 via common mode rejection of external noise. With reference to FIGS. 1 and 2, in an initial laser activation step 52, the laser system controller 34, the torsion laser 38, the LH/RH mode modulator 40, the laser mode converter 42, and the coherent transceiver 16 are activated. Control is then passed to a first transmission step 54.

In the first transmission step 54, torsion laser 38, the LH/RH mode modulator 40, and the laser mode converter 42 are controlled by the laser system controller 34 to produce a left-handed Laguerre-Gaussian torsion mode laser beam for a predetermined time interval (T). The left-handed Laguerre-Gaussian torsion mode laser beam is directed toward the target 12 via the coherent transceiver 16 and the common aperture 14 during the time interval T, which produces a corresponding return beam whose torsion characteristics have been altered upon reflection from the rotating target 12. The return beam is received by the coherent transceiver 16 and the heterodyne detected beat signal resulting from difference processing from detectors 22 and 24 is stored by the target signature extractor 26 of FIG. 1. Subsequently, control is passed to a second transmission step 56.

In the second transmission step 56, directly after the time interval T, the ladar system 10 transmits a right-handed Laguerre-Gaussian torsion mode laser beam toward the target 12 during the time interval (T+1). The right-handed Laguerre-Gaussian torsion mode laser beam reflects from the target 12, altering its torsion characteristics and yielding a corresponding torsion mode return beam. The right-handed return torsion mode return beam is heterodyne detected by difference processing of detectors 22 and 24, producing a second electrical return signal that is stored in the target signature extractor 26. Note that according to equation [12] the sign of m (torsion mode index) changes between + and − for right handed and left handed modes. Therefore, subsequent difference processing between the stored beat signal from the right handed beat signal, and the measured left handed beat signal produces a signal proportional to the target rotation state. This processing step is performed in step 58.

In the subtracting step 58, the target signature extractor 26 subtracts the second electrical return signal from the first electrical return signal, thereby canceling common mode noise, such as platform noise and atmospheric distortion as well as longitudinal target Doppler. The resulting difference signal contains information about the rotational rate of the target 12 as given in equation (4). Sum processing is also performed, which results in a signal that is proportional to longitudinal Doppler and that is independent of target rotation. Subsequently, control is returned to the first transmission step 54. The method 50 then cycles through steps 54–58 until the ladar system 10 is shut down or enters a normal Gaussian mode to measure target range and range rate in response to a mode-timing scheme implemented by the laser system controller 34.

Figure 3:
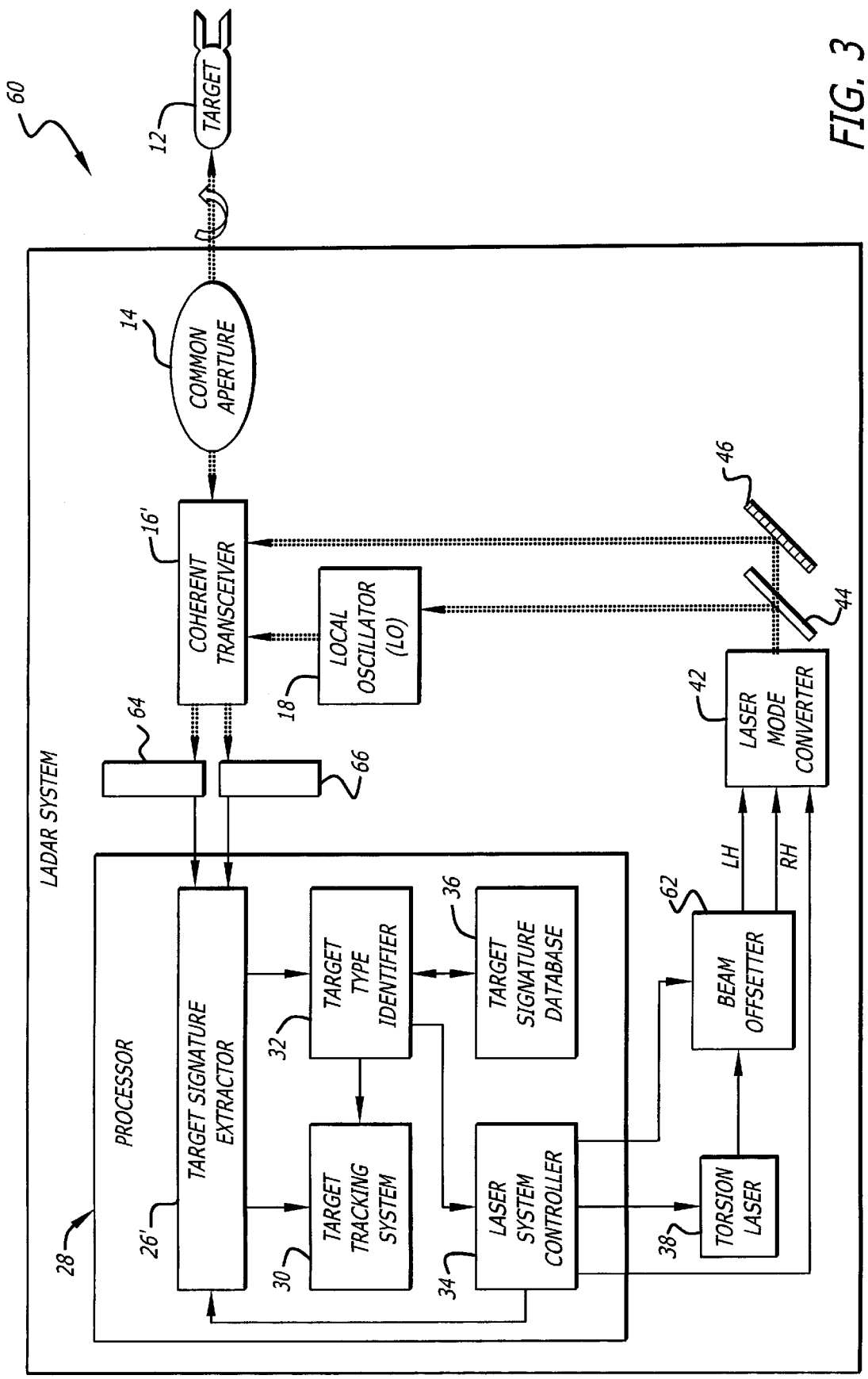
FIG. 3 is a diagram of a second embodiment of the ladar system of the present invention that employs spatially offset torsion mode beams to facilitate target detection, identification, and tracking via target rotation information.

FIG. 3 is a diagram of a second embodiment 60 of the ladar system of the present invention that employs spatially offset torsion mode beams to facilitate target detection, identification, and tracking via target rotational signatures. The construction and operation of the ladar system 60 is similar to the construction and operation of the ladar system 10 of FIG. 1 with the exception that the system 10 has been modified in FIG. 3 to accommodate parallel (simultaneous) transmission and detection of left-handed and right-handed Laguerre-Gaussian torsion mode beams rather than sequential transmission and detection. In particular, the LH/RH mode modulator 40 of FIG. 1 is incorporated into a beam offsetter 62 in FIG. 3, which transmits parallel torsion mode beams simultaneously with a slight offset angle rather than sequentially (see beam offsetter 62). The laser mode converter 42 of FIG. 1 is adjusted to accommodate the parallel torsion mode beams output from the beam offsetter 62 in FIG. 3 (see laser mode converter 42'). The coherent transceiver 16 of FIG. 1 is adjusted to accommodate transmission and reception of two laser beams (see coherent transceiver 16'). The local oscillator 18 of FIG. 1 is adjusted to accommodate transmission of two torsion mode local oscillator reference signals to the coherent transceiver 16' of FIG. 3. The target signature extractor 26 of FIG. 1 is adjusted to accommodate simultaneous reception of left-handed and right-handed Laguerre-Gaussian torsion mode beams (see target signature extractor 26'). The detector 20 is replaced with first and second independent detectors 64 and 66, respectively (each of which are electrically cut in half, similarly to 20). Various component modifications and adjustments to components of the ladar system of FIG. 1 to accommodate parallel beams (spatially multiplexed beams) are simple well-known modifications that may be performed by one skilled in the art with access to the present teachings without undue experimentation.

The local oscillator 18' generates separate reference beams, one for each parallel received beam impinging on the first detector 64 and the second detector 66. In the present embodiment the local oscillator reference beams match the mode of the corresponding transmitted beams. However, those skilled in the art will appreciate that the local oscillator reference beams may have different modes, such as normal Gaussian modes, without departing from the scope of the present invention. In this case, operations and calculations performed by the target signature extractor to determine the target signal based on beat frequencies resulting from the mixing of the laser return signals with the local oscillator reference signals on the detectors 64 and 66 are adjusted accordingly. Appropriate adjustments may be implemented by one of ordinary skill in the art.

When the left-handed and right-handed Laguerre-Gaussian beams are separate, i.e., they are spatially multiplexed as in the system 60 of FIG. 3, the measurements by the detector 64 and 66 of the corresponding return beams are assumed to be simultaneous. Ideally, the target 12 is spatially resolved, and the target dynamics are uniform over the interrogation period and region covered by the two beams.

The left-handed and right-handed Laguerre-Gaussian transmit beams are separated by a predetermined offset. The corresponding left-handed and right-handed Laguerre-Gaussian return beams are heterodyne on the first detector 64 and the second detector 66, respectively as previously described for the detector 20 of the system 10 of FIG. 1.

In the present specific embodiment, the local oscillator beams and the left-handed and right-handed Laguerre-Gaussian transmit beams are derived from the same laser 38. This reduces noise, since the round-trip path between the ladar system 60 and the target 12 becomes mostly common mode.

The exact separation between the transmit beams and between the local oscillator beams is application-specific. One skilled in the art with access to the present teachings will know how to determine the preferred beam separations based on channel cross-talk considerations and by examining heterodyne mixing efficiency.

In the present embodiment, the spatial resolution of the all LG mode is around x≅2.0. This is larger than the uniform illuminated objective 14 for the transceiver 16, where the far field is an Airy pattern, for which the spatial resolution is typically taken as x=1.22. The larger spatial resolution scale is expected, since a Laguerre-Gaussian mode has a larger divergence. In an imaging sense, two adjacent resolved target pixels are selected for Laguerre-Gaussian mode difference processing via the target signature extractor 26' to extract target torsional Doppler.

Figure 4:
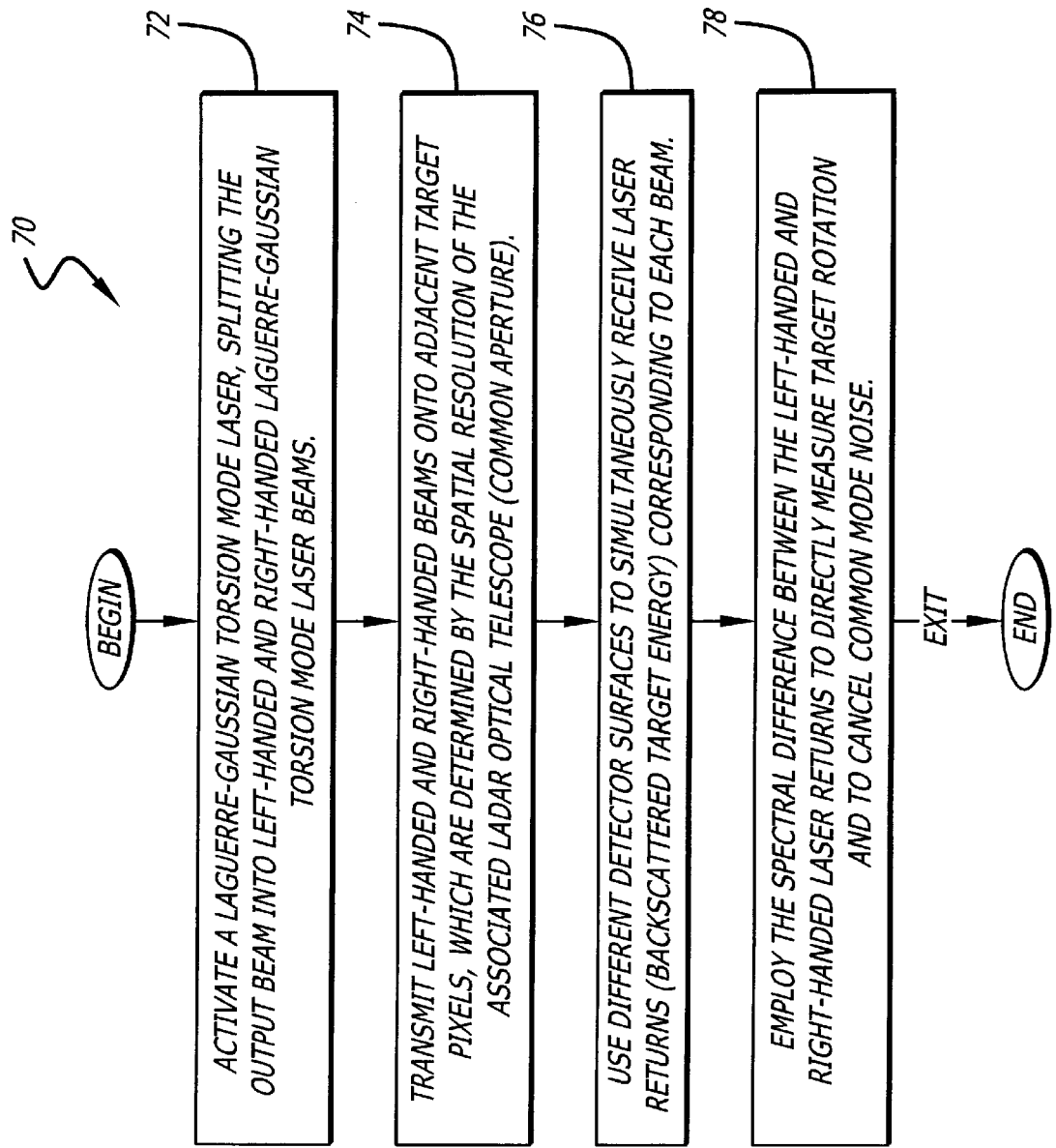
FIG. 4 is flow diagram of a method employed by the ladar system of FIG. 3 to measure target rotation to accurately detect a target while canceling external noise via common mode rejection.

FIG. 4 is flow diagram of a method 70 employed by the ladar system 60 of FIG. 3 to measure target rotation to accurately identify the target via common mode rejection of external noise. With reference to FIGS. 3 and 4, in an initial beam-splitting step 72, the ladar system 60 is activated, and a Laguerre-Gaussian torsion mode beam output from the torsion laser 38 is split into parallel left-handed and right-handed Laguerre-Gaussian torsion mode beams via the beam offsetter 62. Subsequently, control is passed to a transmission step 74

In the transmission step 74, the parallel Laguerre-Gaussian torsion mode beams are transmitted by the coherent transceiver 16 toward the target 12 via the common aperture 14. The coherent transceiver 16 transmits the parallel beams onto adjacent target pixels (not shown). Consequently, the spacing of the transmitted parallel torsion mode beams depends on the resolution of the common aperture 14 and associated telescope. A given target, such as the target 12, will occupy a certain number of pixels, depending on the size and range of the target. The transmitted parallel torsion mode laser beams are aimed at adjacent target pixels to maximize the accuracy of common mode noise rejection. Subsequently, control is passed to a detecting step 76.

In the detecting step 76, the first detector 64 detects the left handed target return in a manner similar to that described above in step 54 of FIG. 2 for embodiment 10 of FIG. 1. That is, the two detector halves (not shown) of the detector 64 are appropriately difference processed by the signal extractor 26' to generate the left handed heterodyne beat signal. At the same time, the second detector 66 receives laser returns corresponding to the transmitted right-handed torsion mode beams, and the signal extractor 26 performs the appropriate difference processing to generate the right handed heterodyne beat signal. Subsequently, control is passed to a subtracting step 78.

In the subtracting step 78, the target signature extractor 26' performs difference processing of the electrical signals between the left handed and right handed heterodyne detected beat signals measured by detectors 64 and 66. The resulting signal component contains target rotation information and lacks common mode interference, which may be caused by platform noise, atmospheric distortion, background clutter, and so on.

Hence, unlike conventional ladar systems, the present invention can measure target rotation and significantly reduce noise via use of torsion mode laser beams. Conventional systems do not coherently detect torsion modes or changes in the torsion modes upon reflection from a rotating target. No known conventional target tracking systems can directly measure torsion of a remote target, but may only infer some target torsion characteristics in asymmetrical rotating targets based on indirect parameters. While use of torsion modes are generally known in incoherent applications, such as particle confinement and biological tweezers applications, their use in coherent measuring of target torsion and in rejecting common mode noise is generally unknown and not exploited.

The present invention employs Laguerre-Gaussian mode beams to exploit the torsional (or azimuthal) Doppler to make a direct measurement of the target torsional state. This state includes the internal flexure modes, which are related to target vibration signatures. Target vibration sensing enabled via the ladar systems 10 and 60 of FIGS. 1 and 3 of present invention facilitates target type detection, since target vibration signatures are largely independent of target aspect and sensing location.

The advantage of vibration sensing with Doppler LADAR is that the signatures seem to be independent of target aspect and sensing location. The method 70 proposes a scheme to use a LH and RH LG beam LADAR (offset by a small angle) to sense the target torsional state.

By employing a left-handed and a right-handed Laguerre-Gaussian ladar system constructed in accordance with the teachings of the present invention, noise elements, i.e., noise drivers, of conventional vibration sensing systems become common mode, and consequently, are eliminated.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. An efficient system for measuring target characteristics via a beam of electromagnetic energy comprising:
   first means for transmitting a torsion mode beam of electromagnetic energy toward a target;
   second means for receiving a return beam of said electromagnetic energy after reflection from said target and providing a first signal in response thereto; and
   third means for measuring target rotation based on said first signal.

2. The system of claim 1 further including fourth means for reducing or eliminating noise in said return beam based on said target rotation via common mode rejection.

3. The system of claim 2 further including fifth means for identifying the type of said target based on said target rotation via comparison to predetermined target rotational signatures.

4. The system of claim 3 wherein said first means includes means for selectively altering the mode of said beam of electromagnetic energy between a first mode and a second mode.

5. The system of claim 4 wherein said first mode is a Laguerre-Gaussian torsion mode.

6. The system of claim 5 wherein said second mode is a Gaussian mode.

7. The system of claim 6 wherein said second mode is characterized by a mode index different from said first mode.

8. The system of claim 6 wherein said second means includes a detector and a local oscillator, said detector electrically divided, and said local oscillator providing a Gaussian or Laguerre-Gaussian beam for mixing with said first mode and said second mode at said detector to yield corresponding beat frequencies.

9. The system of claim 5 wherein said means for selectively altering includes a time-division multiplexer or a spatial multiplexer, and said second mechanism includes a corresponding time-division demultiplexer or spatial demultiplexer, respectively, for providing said first signal.

10. The system of claim 9 wherein said first mode is a left-handed Laguerre-Gaussian torsion mode, and said second mode is a right-handed Laguerre-Gaussian torsion mode.

11. The system of claim 1 wherein said third means includes means for determining rotational Doppler $f_{Doppler}$ due to reflection of said beam of electromagnetic energy from said target, said target rotating about a beam axis of said target determination system at a rotational rate of $\Omega$ cycles per second said rotational Doppler $f_{Doppler}$ given by the following equation:

$$f_{Doppler} = \frac{m\Omega}{\pi},$$

where m is the mode order of said beam of electromagnetic energy.

12. An efficient target determination system comprising:
    first means for generating an initial torsion mode beam of electromagnetic energy;
    second means for providing left-handed and right-handed torsion mode beams based on said initial torsion mode beam of electromagnetic energy;
    third means for selectively transmitting said left-handed and right-handed torsion mode beams toward a target, yielding left-handed and right-handed return beams in response thereto;
    fourth means for receiving said left-handed and right-handed return beams and providing first and second electrical signals in response thereto; and
    fifth means for subtracting said first and second electrical signals to measure target rotational characteristics and cancel common mode noise occurring in said left-handed and right-handed return beams.

13. The system of claim 12 further including sixth means for determining the type of said target based on said target rotational characteristics.

14. The system of claim 13 wherein said fifth means and said sixth means include hardware and/or software running on a processor for analyzing said first and second electrical signals.

15. The system of claim 14 wherein said left-handed and right-handed torsion mode beams are Laguerre-Gaussian torsion mode beams.

16. The system of claim 15 wherein said Laguerre-Gaussian torsion mode beams are laser, radar, microwave, or infrared beams.

17. The system of claim 16 wherein said fifth means includes means for determining rotational Doppler $f_{Doppler}$ due to reflection of said left-handed and right-handed torsion mode beams from said target, said target rotating about a beam axis of said target determination system at a rotational rate of $\Omega$ cycles per second, said rotational Doppler $f_{Doppler}$ given by the following equation:

$$f_{Doppler} = \frac{m\Omega}{\pi},$$

where m is the mode order of the left-hand and right-hand torsion mode beams.

18. The system of claim 15 wherein said third means includes means for transmitting said left-handed and right-handed torsion mode beams at different time intervals (time multiplexing).

19. The system of claim 15 wherein said third means includes means for transmitting said left-handed and right-handed torsion mode beams simultaneously in parallel (spatial multiplexing).

20. The system of claim 19 wherein said fourth means includes means for selectively changing a mode index of one or more of said Laguerre-Gaussian torsion mode beams to facilitate determination of said target rotational characteristics.

21. A coherent ladar system comprising:
    a coherent laser transceiver for transmitting a specific torsion mode beam and incorporating a coherent detection system for detecting a corresponding torsion mode return beam and employing a similar torsion mode local oscillator reference signal;
    a detector in communication with said transceiver for detecting a mix of said local oscillator reference signal and said torsion mode return beam and yielding a beat frequency in response thereto; and
    a processor running an algorithm for determining target rotation about a line-of-sight axis based on said beat frequency.

22. The system of claim 21 wherein said beat frequency is independent of the frequency and carrier frequency of said specific torsion mode beam.

23. The system of claim 22 wherein said coherent ladar system is a monostatic continuous wave ladar system.

24. The system of claim 23 wherein said coherent detection system includes a local oscillator that transmits a Gaussian beam while said specific torsion mode beam is a Laguerre-Gaussian torsion mode beam.

25. The system of claim 24 wherein said detector and said torsion mode beam are sized according to the following:

$$\mu_T = \frac{4\omega_T}{D}, \mu_L = \frac{4\omega_L}{D}, \gamma = \frac{Dd}{2\lambda f},$$

where $\mu_T$ and $\mu_L$ are dimensionless measures of the diameters of said Gaussian beam and said Laguerre-Gaussian torsion mode beam, respectively, relative to the diameter D of an aperture of said ladar system; $\gamma$ is a measure of the size of said detector relative to a diffraction (spot) size of said aperture in a plane of said detector; d is the diameter of said detector; f is the focal length of said aperture. $\lambda$ is the wavelength of said Laguerre-Gaussian torsion mode beam; and the factor of four scales $\mu_T$ and $\mu_L$ so that when $\mu_T \leq 1$ and $\mu_L \leq 1$, said Gaussian beam is substantially untruncated.

26. The system of claim 25 wherein $\mu_T \cong 1.4$, $\mu_L \cong 1.4$ to 1.5, and $\gamma \cong 1.5$.

27. The system of claim 23 wherein said coherent detection system includes a local oscillator that transmits a reference Laguerre-Gaussian beam while said specific torsion mode beam is a transmit Laguerre-Gaussian torsion mode beam.

28. The system of claim 22 wherein said specific torsion mode beam and said local oscillator reference signal are Laguerre-Gaussian signals which mix on a surface of said detector, which produces a photo-current i(t) in response thereto as given by the following equation:

$$i(t) = \frac{e\eta P(t)}{h\nu} = \frac{e\eta}{h\nu}|E_{lo}(t) + E_s(t)|^2$$

$$= \frac{e\eta}{h\nu}(\overline{E_{lo}^2} + \overline{E_s^2} + 2\,Re(\overline{E_{lo}E_s})\cos(\phi_{lo}(t) - \phi_s(t)),$$

where h is Plank's constant and v is the frequency of the beam such that hv is the energy of a photon in the beam; e is the unit of electrical charge; η is the detector quantum efficiency. $E_{lo}(t)$ is the electric field of the local oscillator beam. $E_s(t)$ is the electric field of the Laguerre-Gaussian return beam; $\phi_{lo}(t)$ is the phase of the local oscillator beam; $\phi_s(t)$ is the phase of the Laguerre-Gaussian return beam; and the overbar indicates a time average.

29. The system of claim 28 wherein said target has both rotational and translational (longitudinal) motion, the photo-current frequency ($f_s$) associated with said return beam is given by:

$$f_s = f_{offset} \pm \left(2m\Omega + \frac{2V}{\pi}\right),$$

where perfect heterodyning occurs between said local oscillator reference signal and said specific torsion mode beam; $f_{offset}$ is a local oscillator offset frequency; m is a mode number of said specific torsion mode return beam; Ω is the rotational rate of said target about an optical axis of said system; V represents a longitudinal velocity component of said target; and λ is the laser wavelength.

30. The system of claim 29 wherein said ladar system is characterized by the following speckle target mixing efficiency ($E_{het}^S(x)$):

$$\varepsilon_{het}^S(x) = 2\pi^2 \left(\frac{\pi\mu_T}{2}\right)^2 \left(\frac{\pi\mu_L}{2}\right)^2 \frac{\int_0^{2\pi} d\theta \int_0^{\infty} x'\,dx'|\bar{\eta}_{\infty}^T(z)|^2|\eta_{\gamma}^L(x')|^2}{1 - \left(1 + \frac{(\pi\mu_L\gamma)^2}{8}\right)\exp(-(\pi\mu_L\gamma)^2/8)},\text{ where}$$

$$\bar{\eta}_{\infty}^T(z) = \frac{\eta_{\infty}^T\left(\sqrt{x^2 + x'^2 - 2xx'\cos(\theta)}\right)}{2\pi},\text{ and}$$

$$\eta_{\infty}^T(z) = 2\sum_{n=1,3}\frac{nJ_n(\pi z)}{\pi z}\int_0^{\infty} dx' J_n(\pi x')\exp(-(\pi\mu_T x'/4)^2),$$

where z is a coordinate in the direction of propagation of the beam. x and x' are transverse coordinate a plane perpendicular to the front of the target 12 (target plane) such that $z=\sqrt{x^2+x'^2-2xx'\cos(\theta)}$; $J_n(x)$ is an $n^{th}$ order Bessel function of x; where $\mu_T$ and $\mu_L$ are dimensionless measures of the beam diameters of said reference and transmit Laguerre-Gaussian torsion mode beams, respectively; γ is a measure of the size of said detector relative to a diffraction (spot) size of a pupil of an aperture of said ladar system in a plane of said detector; and θ is an angle variable.

31. The system of claim 30 wherein $\mu_T \cong 1.2, \mu_L \cong 1.2$ to 1.4, and γ≅1.8.

32. A method for implementing active mode sensing via a torsion mode beam electromagnetic energy comprising the steps of:

transmitting left-handed and right-handed Laguerre-Gaussian mode transmit beams at first interval and second time intervals, respectively;

receiving left-handed and right-handed Laguerre-Gaussian return beams corresponding to said left-handed and right-handed Laguerre-Gaussian mode transmit beams at third and forth time intervals and forming a difference between spectral content of said left-handed and right-handed Laguerre-Gaussian return beams.

33. A method for implementing active mode sensing via a torsion mode beam electromagnetic energy comprising the steps of:

transmitting separate left-handed and right-handed Laguerre-Gaussian mode transmit beams approximately simultaneously at a predetermined separation;

receiving left-handed and right-handed Laguerre-Gaussian return beams corresponding to said left-handed and right-handed Laguerre-Gaussian mode transmit beams and forming a difference between spectral content of said left-handed and right-handed Laguerre-Gaussian return beams.

34. The method of claim 33 wherein said step of receiving includes employing two detectors, one each of left-handed and right-handed Laguerre-Gaussian return beams.

35. An efficient method for measuring target characteristics via a beam of electromagnetic energy comprising the steps of:

transmitting a torsion mode beam of energy toward said target;

receiving a return beam of said energy after reflection from said target and providing a first signal in response thereto; and measuring target rotation based on said first signal.

* * * * *